United States Patent
Lu

(10) Patent No.: US 9,122,457 B2
(45) Date of Patent: Sep. 1, 2015

(54) HANDHELD DEVICE AND UNLOCKING METHOD THEREOF

(75) Inventor: Yu-Jhang Lu, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 138 days.

(21) Appl. No.: 13/469,506

(22) Filed: May 11, 2012

(65) Prior Publication Data
US 2013/0300673 A1 Nov. 14, 2013

(51) Int. Cl.
*G05B 19/00* (2006.01)
*G06F 1/16* (2006.01)
*G06F 3/0488* (2013.01)

(52) U.S. Cl.
CPC ............ *G06F 1/1694* (2013.01); *G06F 3/0488* (2013.01)

(58) Field of Classification Search
CPC .................................. G06F 3/041; G06F 3/048
USPC ........ 345/173, 7–9, 419, 156; 349/11, 13, 15, 349/348, 42, 51–53; 348/42, 51–53; 359/462, 466; 726/19
See application file for complete search history.

(56) References Cited

U.S. PATENT DOCUMENTS

| | | | |
|---|---|---|---|
| 2007/0236330 A1* | 10/2007 | Cho et al. | 340/5.54 |
| 2009/0312051 A1* | 12/2009 | Hansson et al. | 455/556.1 |
| 2009/0322691 A1 | 12/2009 | Chiu | |
| 2010/0007618 A1* | 1/2010 | Park et al. | 345/173 |
| 2010/0009658 A1* | 1/2010 | Wu et al. | 455/411 |
| 2010/0180336 A1* | 7/2010 | Jones et al. | 726/19 |
| 2011/0053581 A1 | 3/2011 | Kao et al. | |
| 2011/0285668 A1* | 11/2011 | Kim et al. | 345/174 |
| 2012/0167202 A1* | 6/2012 | Kim | 726/19 |
| 2012/0218177 A1* | 8/2012 | Pang et al. | 345/156 |
| 2013/0100044 A1* | 4/2013 | Zhao et al. | 345/173 |
| 2013/0113731 A1* | 5/2013 | Yoo et al. | 345/173 |
| 2013/0184872 A1* | 7/2013 | Chen et al. | 700/275 |

FOREIGN PATENT DOCUMENTS

| | | |
|---|---|---|
| CN | 101616210 | 12/2009 |
| CN | 102053794 | 5/2011 |
| CN | 102368796 | 3/2012 |
| CN | 102438074 | 5/2012 |

OTHER PUBLICATIONS

Office Action from corresponding Taiwanese Appln. No. 101116750, dated Apr. 23, 2014.

* cited by examiner

*Primary Examiner* — Quan-Zhen Wang
*Assistant Examiner* — Tony Davis
(74) *Attorney, Agent, or Firm* — Grossman, Tucker, Perreault & Pfleger, PLLC

(57) ABSTRACT

A handheld device and an unlocking method thereof are provided. The handheld device comprises a touch panel, a motion sensor and a processor. The touch panel senses a touch to generate a touch signal. The motion sensor senses a motion of the handheld device to generate a motion signal. The processor, which is electrically connected to the touch panel and the motion sensor, receives the touch signal and the motion signal and unlocks the handheld device according to the touch signal and the motion signal.

10 Claims, 7 Drawing Sheets

HANDHELD DEVICE AND UNLOCKING METHOD THEREOF

FIELD OF THE INVENTION

The present invention relates to a handheld device and an unlocking method thereof. More particularly, the handheld device of the present invention is unlocked when a touch panel thereof is touched and the handheld device is moved.

BACKGROUND

With rapid advancement of the science and technologies, people's demands for information, communication and entertainments are also increasing. To meet these demands, more and more kinds of handheld devices have been produced and used nearly everywhere in people's daily life. Common handheld devices include mobile phones, personal digital assistants (PDAs), multimedia players, tablet computers, satellite positioning & navigation devices and so on.

Taking mobile phones as an example, most of the mobile phones currently available in the market comprise a touch panel and a motion sensing device to accomplish the touch control operations and the move control operations (e.g., turnover or swaying) of the mobile phones. Conventionally, when a user desires to restore a mobile phone from a locked status into a normal operation status, the user must contact a specific key on the mobile phone and/or use a finger to touch and slide on a touch panel of the mobile phone according to a specific gesture displayed on a screen of the mobile phone.

However, the aforesaid unlocking operations are rather complex and indirect. Accordingly, an urgent need exists in the art to provide a convenient unlocking method that allows the user to unlock a handheld device more directly and quickly.

SUMMARY

An objective of the present invention is to provide a handheld device and an unlocking method thereof. The handheld device can be unlocked by sensing a user's touch on a touch panel thereof and a motion of the handheld device at the same time based on operation habits of the user. Thereby, through the unlocking mechanism of the present invention, the user can unlock the handheld device without the need of contacting a specific key on the handheld device and/or using a finger to touch and slide on the touch panel according to a specific gesture displayed on a screen of the handheld device.

To achieve the aforesaid objective, the present invention discloses a handheld device, which comprises a touch panel, a motion sensor and a processor. The touch panel is configured to sense a touch to generate a touch signal. The motion sensor is configured to sense a motion of the handheld device to generate a motion signal. The processor, which is electrically connected to the touch panel and the motion sensor, is configured to receive the touch signal and the motion signal and to unlock the handheld device according to the touch signal and the motion signal.

Furthermore, the present invention further discloses an unlocking method for a handheld device. The handheld device comprises a touch panel, a motion sensor and a processor. The processor is electrically connected to the touch panel and the motion sensor, and is configured to execute the unlocking method. The unlocking method comprises the following steps of: (a) receiving a touch signal from the touch panel, the touch signal being generated by the touch panel when a touch is sensed by the touch panel; (b) receiving a motion signal from the motion sensor, the motion signal being generated by the motion sensor when a motion of the handheld device is sensed by the motion sensor; and (c) unlocking the handheld device according to the touch signal and the motion signal.

The detailed technology and preferred embodiments implemented for the subject invention are described in the following paragraphs accompanying the appended drawings for people skilled in this field to well appreciate the features of the claimed invention.

DETAILED DESCRIPTION

The present invention mainly relates to a handheld device and an unlocking method thereof. It shall be appreciated that, description of the following embodiments is only for purpose of illustration rather than to limit the scope of the present invention. Moreover, in the following embodiments and the attached drawings, elements unrelated to the present invention are omitted from depiction; and dimensional relationships among individual elements in the attached drawings are illustrated only for ease of understanding but not to limit the actual scale.

Figure 1:
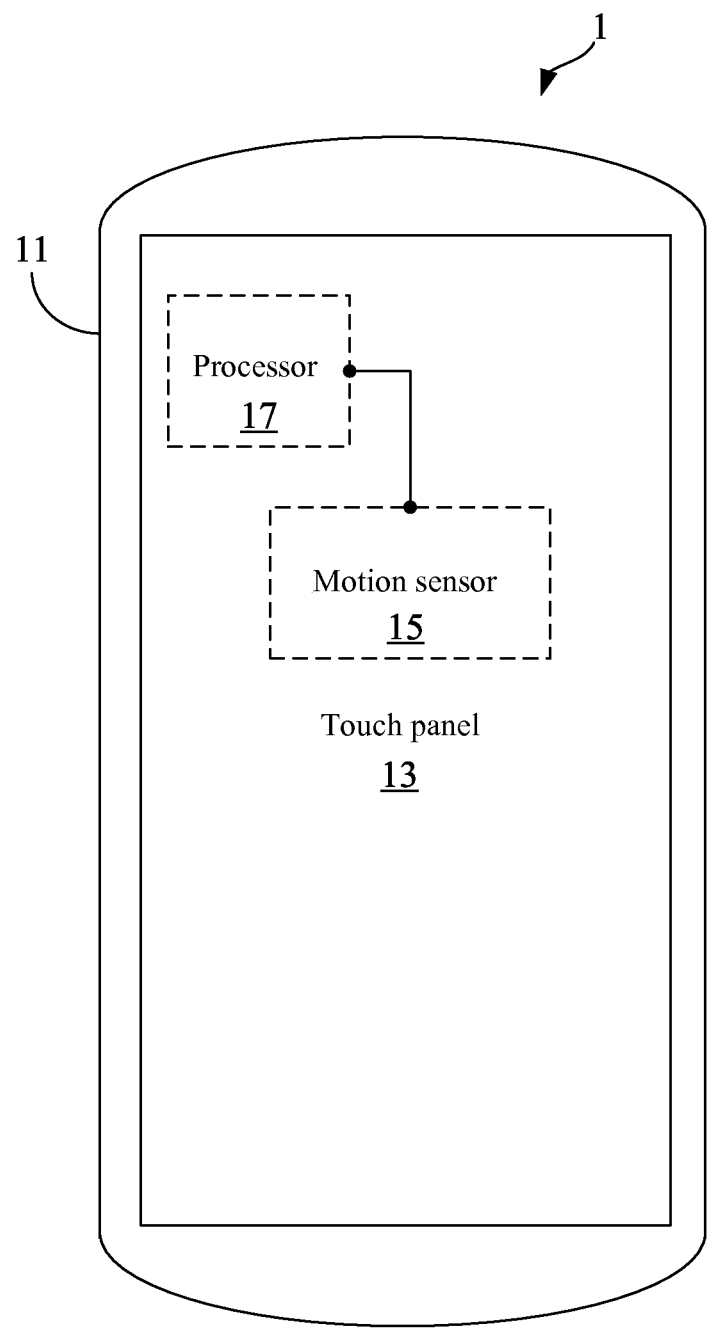
FIG. 1 is a schematic view of a handheld device 1 in accordance with a first embodiment of the present invention.

FIG. 1 depicts a handheld device 1 according to a first embodiment of the present invention. The handheld device 1 may be a mobile phone, a personal digital assistant (PDA), a tablet computer, a satellite positioning & navigation device or some other portable device. The handheld device 1 comprises a housing 11, a touch panel 13, a motion sensor 15 and a processor 17. It shall be noted that, for purpose of simplicity, other elements of the handheld device 1, such as a display module, a communication module, an input module and elements less related to the present invention, are all omitted from depiction herein.

Figure 2:
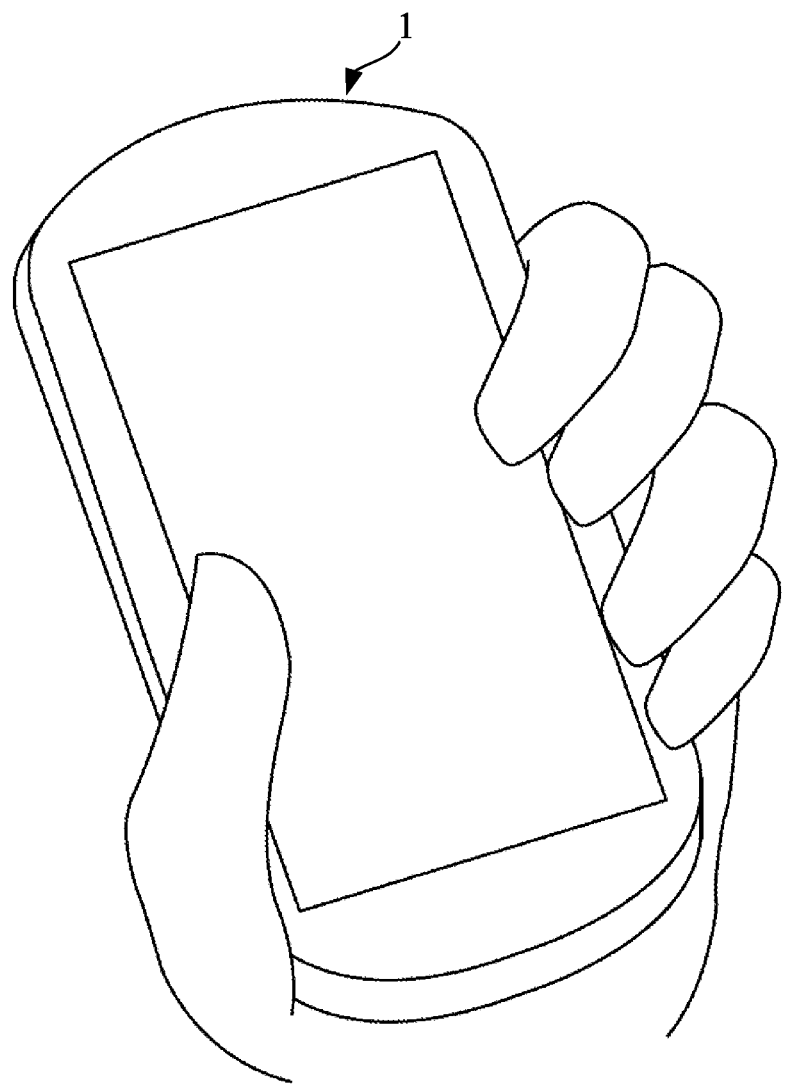
FIG. 2 depicts a view of the handheld device 1 when being held by a user, which corresponds to the first embodiment.

In this embodiment, the touch panel 13 is a capacitive touch panel and is disposed on an upper surface of the housing 11. The touch panel 13 is configured to sense a touch to generate a touch signal. Specifically, as shown in FIG. 2, based on general users' habits of operating the handheld device 1, when the handheld device 1 in a locked status is taken up by the user, the touch panel 13 is usually touched by the user's finger so that the touch panel 13 senses the touch to generate a touch signal. It shall be appreciated that, in other embodiments, the touch panel 13 may be a resistive touch panel, an optical touch panel or an electromagnetic touch panel, although the present invention is not limited thereto.

The motion sensor 15 and the processor 17 are disposed in a receiving space of the housing 11 (i.e., within the housing 11). The motion sensor 15 is configured to sense a motion of the handheld device 1 to generate a motion signal. The motion sensor 15 may be a gravity sensor (G-sensor), a gyroscope, or a combination thereof. In detail, when the handheld device 1 in the locked status is taken up by the user, a motion of the handheld device 1 will be sensed by the motion sensor 15 in response to the user's action so as to generate a motion signal.

The processor 17 is electrically connected to the touch panel 13 and the motion sensor 15. The processor 17 is configured to receive the touch signal and the motion signal from the touch panel 13 and the motion sensor 15 respectively, and to unlock the handheld device 1 according to the touch signal and the motion signal. Furthermore, when the processor 17 receives the touch signal and the motion signal from the touch panel 13 and the motion sensor 15 respectively at the same time, the processor 17 determines that the user desires to operate the handheld device 1 and thus unlocks the handheld device 1 so that the handheld device 1 is restored from the locked status into a normal operation status. It shall be appreciated that, "the processor 17 receives the touch signal and the motion signal at the same time" means that the processor 17 receives the touch signal and the motion signal substantially at the same time.

Specifically, the processor 17 is also electrically connected to the display module (not shown) of the handheld device 1. When the handheld device 1 is unlocked by the processor 17, the processor 17 activates the display module and executes an application program to enable the display module to display a picture of the application program. The aforesaid application program comprises an operating system running in the handheld device 1 and various programs residing in the operating system.

Figure 3:
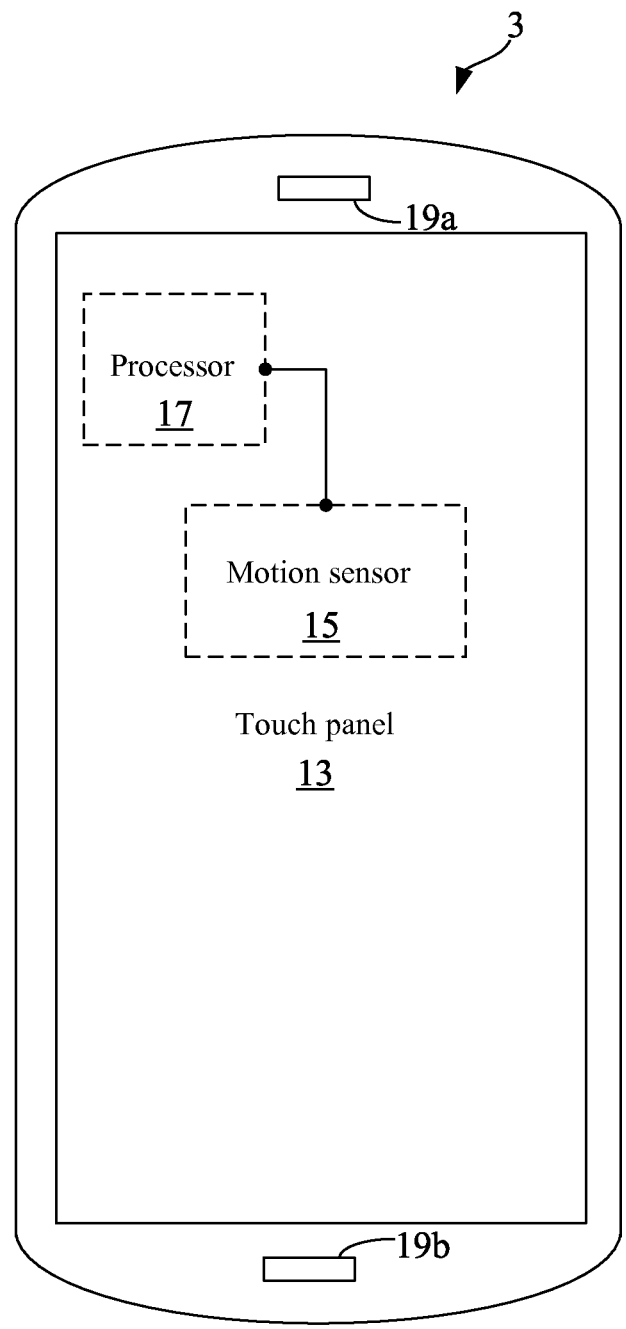
FIG. 3 is a schematic view of a handheld device 3 in accordance with a second embodiment of the present invention.

FIG. 3 depicts a handheld device 3 according to a second embodiment of the present invention. Different from the first embodiment, the handheld device 3 of the second embodiment further comprises a first sound input/output (I/O) module 19a and a second sound I/O module 19b. The first sound I/O module 19a and the second sound I/O module 19b are disposed at two sides of the touch panel respectively. It shall be noted that, the positions of the first sound I/O module 19a and the second sound I/O module 19b are not limited to be as shown in FIG. 3 as long as they are substantially disposed at two sides of the touch panel; that is, it is unnecessary for the first sound I/O module 19a and the second sound I/O module 19b to be disposed on a same surface of the handheld device 3. In practical operations, when the user uses the handheld device 3 to communicate, one of the first sound I/O module 19a and the second sound I/O module 19b is closer to the user's ear (i.e., used as a speaker) and the other of the first sound I/O module 19a and the second sound I/O module 19b is closer to the user's mouth (i.e., used as a microphone).

Furthermore, in this embodiment, the motion sensor 15 further senses an orientation of the handheld device 3 to generate an orientation signal. Then, the processor 17 receives the orientation signal from the motion sensor 15, and sets one of the first sound I/O module 19a and the second sound I/O module 19b as a microphone and the other of the first sound I/O module 19a and the second sound I/O module 19b as a speaker according to the orientation signal.

Figure 4:
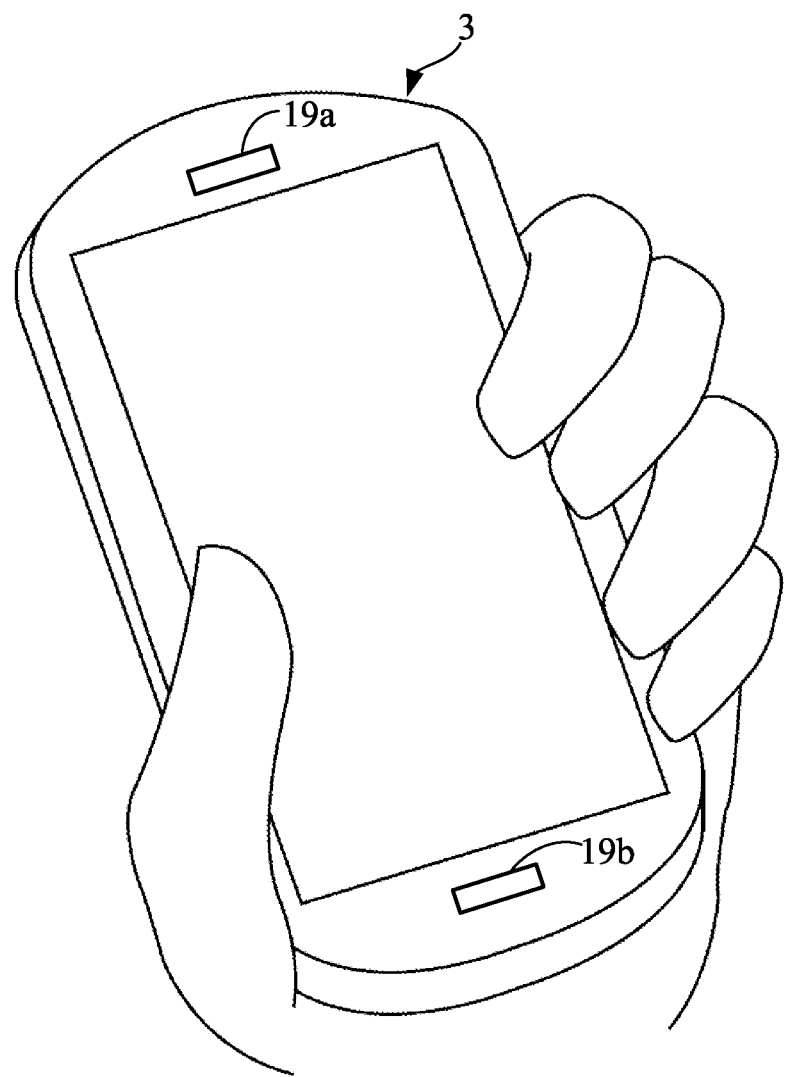
FIG. 4 depicts a view of the handheld device 3 when being held by the user, which corresponds to the second embodiment.

As an example, when the user takes up the mobile phone as shown in FIG. 4, the motion sensor 15 senses the orientation of the handheld device 3; that is, the motion sensor 15 senses that the handheld device 3 is oriented at such an angle that the first sound I/O module 19a is at a higher longitudinal level than the second sound I/O module 19b. In this case, the processor 17 sets the first sound I/O module 19a as the speaker and the second sound I/O module 19b as the microphone according to the orientation signal generated by the motion sensor 15.

Figure 5:
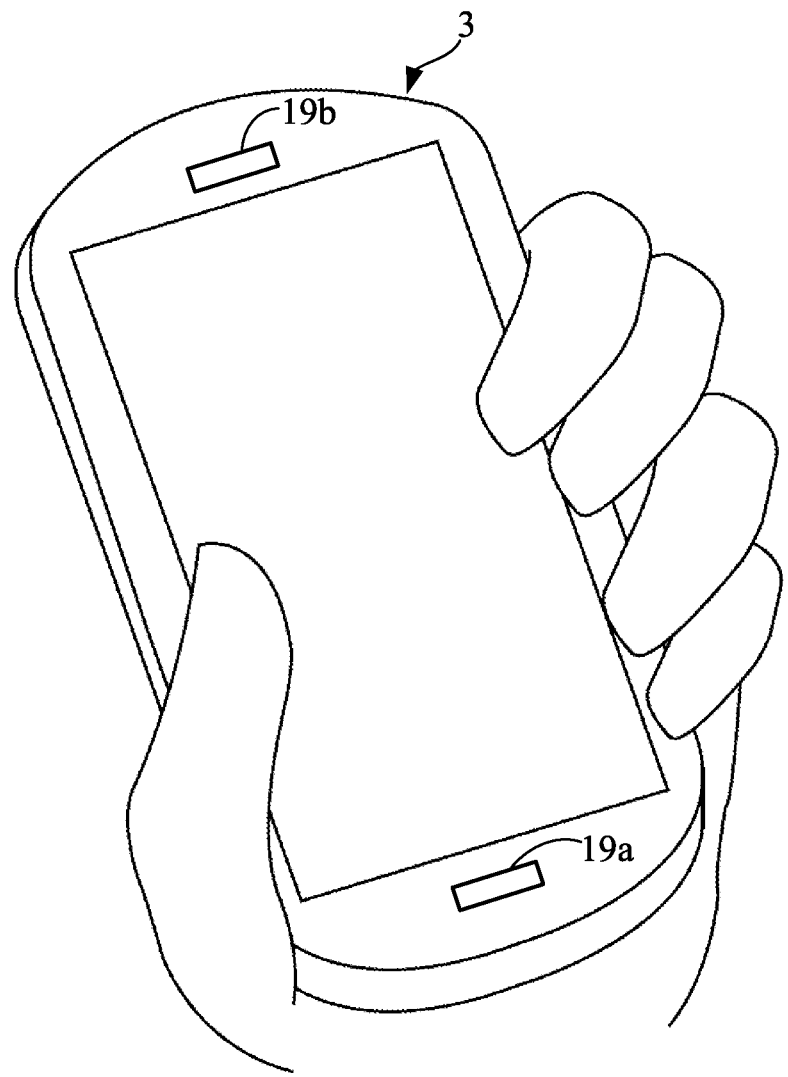
FIG. 5 depicts another view of the handheld device 3 when being held by the user, which corresponds to the second embodiment.

As another example, when the user takes up the mobile phone as shown in FIG. 5, the motion sensor 15 senses the orientation of the handheld device 3; that is, the motion sensor 15 senses that the handheld device 3 is oriented at such an angle that the second sound I/O module 19b is at a higher longitudinal level than the first sound I/O module 19a. In this case, the processor 17 sets the second sound I/O module 19b as the speaker and the first sound I/O module 19a as the microphone according to the orientation signal generated by the motion sensor 15.

Figure 6:
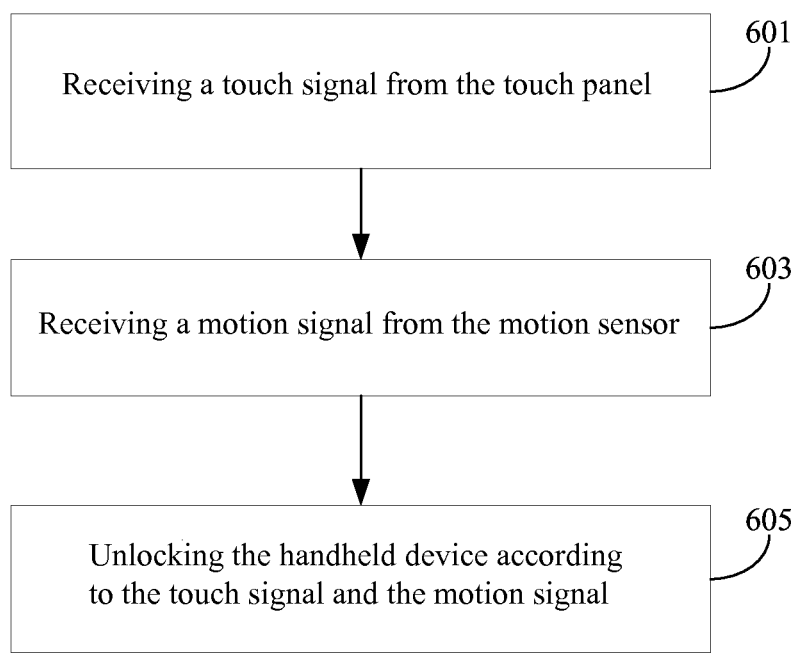
FIG. 6 is a flowchart diagram of an unlocking method in accordance with to a third embodiment of the present invention.

A third embodiment of the present invention is shown in FIG. 6, which is a flowchart of an unlocking method of the present invention. The unlocking method is used for a handheld device (e.g., the handheld device 1 of the first embodiment or the handheld device 3 of the second embodiment) which comprises a housing, a touch panel, a motion sensor and a processor. The touch panel is disposed on a surface of the housing. The motion sensor and the processor are disposed in a receiving space of the housing. The processor is electrically connected to the touch panel and the motion sensor, and is configured to execute the unlocking method of the present invention as described below.

Firstly, step 601 is executed to receive a touch signal from the touch panel. The touch signal is generated by the touch panel when a touch (e.g., the touch of the user's finger in FIG. 2) is sensed by the touch panel. Step 603 is executed to receive a motion signal from the motion sensor. The motion signal is generated by the motion sensor when a motion (e.g., the motion caused when the user takes up the handheld device in FIG. 2) of the handheld device is sensed by the motion sensor.

Then, step 605 is executed to unlock the handheld device according to the touch signal and the motion signal. Specifically in step 605, it is determined that the touch signal and the motion signal are received substantially at the same time so that the display module is activated and an application program is executed to enable the display module of the handheld device to display a picture of the application program. The aforesaid application program comprises an operating system running in the handheld device and various programs residing in the operating system.

In addition to the aforesaid steps, the third embodiment can also execute all the operations and functions set forth in the first embodiment. How the unlocking method of the present invention executes these operations and functions will be readily appreciated by those of ordinary skill in the art based on the explanation of the first embodiment, and thus will not be further described herein.

Figure 7:
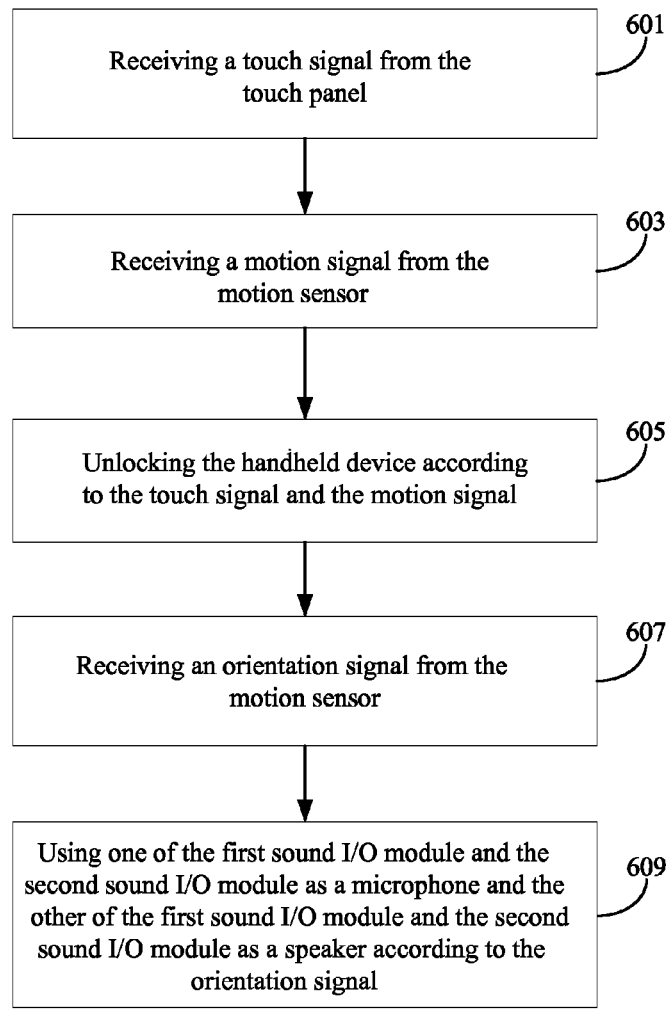
FIG. 7 is a flowchart diagram of an unlocking method in accordance with a fourth embodiment of the present invention.

A fourth embodiment of the present invention is shown in FIG. 7, which is a flowchart diagram of an unlocking method of the present invention. Different from the third embodiment, the handheld device further comprises a first sound I/O module and a second sound I/O module, which are disposed at two sides of the touch panel respectively. The unlocking method of this embodiment of the present invention further comprises steps 607 and 609, as shown in FIG. 7. Step 607 is executed to receive an orientation signal from the motion sensor. The orientation signal is generated by the motion sensor when an orientation of the handheld device is sensed by the motion sensor. Then, step 609 is executed to set one of the first sound I/O module and the second sound I/O module as a microphone and the other of the first sound I/O module and the second sound I/O module as a speaker according to the orientation signal.

In addition to the aforesaid steps, the fourth embodiment can also execute all the operations and functions set forth in the first embodiment and the second embodiment. How the unlocking method of the present invention executes these operations and functions will be readily appreciated by those of ordinary skill in the art based on the explanation of the first, second and third embodiments, and thus will not be further described herein.

According to the above descriptions, the handheld device and the unlocking method thereof of the present invention can unlock the handheld device by sensing a user's touch on a touch panel of the handheld device and a motion of the handheld device at the same time. Thereby, through the unlocking mechanism of the present invention, the user can unlock the handheld device without the need of contacting a specific key on the handheld device and/or using a finger to touch and slide on the touch panel according to a specific gesture displayed on a screen of the handheld device. On the other hand, the handheld device and the unlocking method thereof of the present invention further sense an orientation of the handheld device to use one of the sound I/O modules disposed at two sides as a microphone and the other of the sound I/O modules as a speaker. In this way, the handheld device and the unlocking method thereof of the present invention allow the user to operate the handheld device more conveniently.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

BRIEF DESCRIPTION OF REFERENCE NUMERALS 1 handheld device
11: housing
13: touch panel
15: motion sensor
17: processor
3: handheld device
19a: first sound input/output module
19b: second sound input/output module

What is claimed is:

1. A handheld device, comprising:
a touch panel configured to sense a touch and generate a touch signal in response to said touch being detected;
a motion sensor configured to sense a motion of the handheld device when the handheld device is taken up by a user, and to generate a motion signal in response to said motion being sensed;
a processor; and
at least one computer-readable storage medium having instructions stored thereon which when executed by the processor result in the following operation; unlocking the handheld device in response to the touch signal and the motion signal being received substantially at the same time;
the handheld device further comprising:
a housing,
a first sound input/output (I/O) module and
a second sound I/O module,
wherein the touch panel is disposed on a surface of the housing, the motion sensor and the processor are disposed in a receiving space of the housing, the first sound I/O module and the second sound I/O module are disposed at two sides of the touch panel respectively,
the motion sensor is further configured to sense an orientation of the handheld device to generate an orientation signal, and
the processor is further configured to receive the orientation signal from the motion sensor, and set one of the first sound I/O module and the second sound I/O module as a microphone and the other of the first sound I/O module and the second sound I/O module as a speaker according to the orientation signal.

2. The handheld device as claimed in claim 1, wherein the motion sensor is a gravity sensor (G-sensor).

3. The handheld device as claimed in claim 1, wherein the motion sensor is a gyroscope.

4. The handheld device as claimed in claim 1, wherein the motion sensor comprises a G-sensor and a gyroscope.

5. The handheld device as claimed in claim 1, further comprising a display module electrically connected to the processor, wherein the processor determines that the touch signal and the motion signal are received substantially at the same time so as to activate the display module.

6. The handheld device as claimed in claim 1, wherein the touch panel is a capacitive touch panel.

7. An unlocking method for a handheld device,
the handheld device comprising
a touch panel,
a motion sensor and
a processor,
the processor being electrically connected to the touch panel and the motion sensor, and the unlocking method being executed by the processor and comprising the following steps of:
(a) receiving a touch signal from the touch panel, the touch signal being generated by the touch panel when a touch is sensed by the touch panel;
(b) receiving a motion signal from the motion sensor, the motion signal being generated by the motion sensor when the motion sensor detects a motion of the handheld device when the handheld device is taken up by a user; and
(c) unlocking the handheld device in response to the touch signal and the motion signal being received substantially at the same time,
wherein the handheld device further comprises
a housing,
a first sound I/O module and a second sound I/O module,
the touch panel is disposed on a surface of the housing,
the motion sensor and the processor are disposed in a receiving space of the housing, and
the first sound I/O module and the second sound I/O module are disposed at two sides of the touch panel respectively,
the unlocking method further comprising the following steps of:
(d) receiving an orientation signal from the motion sensor, the orientation signal being generated by the motion sensor when an orientation of the handheld device is sensed by the motion sensor; and
(e) setting one of the first sound I/O module and the second sound I/O module as a microphone and the other of the first sound I/O module and the second sound I/O module as a speaker according to the orientation signal.

8. The unlocking method as claimed in claim 7, wherein the handheld device further comprises a display module electrically connected to the processor, and the step (c) further comprises the following step of:
(c1) determining that the touch signal and the motion signal are received substantially at the same time so as to activate the display module.

9. A handheld device, comprising:
a housing;
a touch panel, disposed on a surface of the housing;
a first sound input/output (I/O) module disposed at a first side of the touch panel;
a second sound I/O module disposed at a second side of the touch panel, the second side being opposite to the first side;
a motion sensor, disposed in a receiving space of the housing, being configured to sense an orientation of the handheld device to generate an orientation signal;
a processor electrically connected to the touch panel and the motion sensor and disposed in the receiving space, being configured to receive the orientation signal from the motion sensor, and set one of the first sound I/O module and the second sound I/O module as a microphone and the other of the first sound I/O module and the second sound I/O module as a speaker according to the orientation signal.

10. A input/output (I/O) module setting method for a handheld device,
the handheld device comprising
a housing,
a touch panel,
a motion sensor,
a processor,
a first sound I/O module and
a second sound I/O module,
the touch panel being disposed on a surface of the housing,
the motion sensor and the processor being disposed in a receiving space of the housing, and
the first sound I/O module and the second sound I/O module being disposed at two sides of the touch panel respectively,
the method comprising the following steps of:
(a) receiving an orientation signal from the motion sensor, the orientation signal being generated by the motion sensor when an orientation of the handheld device is sensed by the motion sensor; and
(b) setting one of the first sound I/O module and the second sound I/O module as a microphone and the other of the first sound I/O module and the second sound I/O module as a speaker according to the orientation signal.

* * * * *